United States Patent [19]

Anderson

[11] 4,359,669

[45] Nov. 16, 1982

[54] LAMP MODULATING CIRCUITRY

[75] Inventor: Thomas E. Anderson, South Euclid, Ohio

[73] Assignee: General Electric Company, Schenectady, N.Y.

[21] Appl. No.: 219,003

[22] Filed: Dec. 22, 1980

[51] Int. Cl.³ .................... H05B 37/02; H05B 41/44
[52] U.S. Cl. ............................ 315/208; 84/464 R; 315/200 A; 315/291; 340/815.17
[58] Field of Search ............ 315/200 A, 208, 291; 340/366 B, 148; 367/198; 362/811; 84/464 R

[56] References Cited

U.S. PATENT DOCUMENTS

| | | | |
|---|---|---|---|
| 3,163,077 | 12/1964 | Shank | 84/464 R |
| 3,222,574 | 12/1965 | Silvestri | 315/200 A |
| 3,234,847 | 2/1966 | Williams | 84/464 R X |
| 3,474,774 | 10/1969 | Johnson et al. | 128/1 R |
| 3,719,857 | 3/1973 | Sharp | 84/464 R X |
| 3,798,638 | 3/1974 | Goldschmied | 340/366 B |
| 3,805,049 | 4/1974 | Frank et al. | 362/811 X |
| 3,806,919 | 4/1974 | Comey | 340/366 B |
| 3,924,231 | 12/1975 | McClure | 340/366 B |

OTHER PUBLICATIONS

Ward, *Sound-to-Light Unit*, Wireless World, vol. 84, No. 1511, Jul. 1978, p. 75.

*Primary Examiner*—Eugene R. LaRoche
*Attorney, Agent, or Firm*—Norman C. Fulmer; Philip L. Schlamp; Fred Jacob

[57] ABSTRACT

Lamp modulating circuitry particularly useful for flashing fluorescent lamps in response to music or other audio signals employs an input filter to screen out signals having frequencies less than 20 hertz or greater than 200 hertz. An amplitude demodulator detects the peak amplitude of signals received from the input filter and develops a signal representing the envelope of the low audio frequencies. An automatic gain control compares the instantaneous and average signals derived from the amplitude demodulator and develops an average signal using an output filter. Signals transmitted past the output filter are used by lamp flashing circuitry to cause the output of a fluorescent lamp to be modulated.

21 Claims, 7 Drawing Figures

LAMP MODULATING CIRCUITRY

BACKGROUND OF THE INVENTION

1. Field of the Invention

The invention relates to techniques for flashing fluorescent lamps and, more particularly, to circuitry which may be used to flash fluorescent lamps in response to audio signals such as music.

2. Description of the Prior Art

Although many techniques are known for flashing various types of lamps, these techniques have not been as effective as desired in flashing fluorescent lamps, particularly ultraviolet lamps, in response to audio signals such as that provided by music. So-called "color organs" effectively flash lamps, but the color organs have been successful only with easily modulated incandescent lamps, not fluorescent lamps.

One of the problems not adequately addressed by prior fluorescent lamp modulation techniques relates to the size and expense of the apparatus employed to flash the lamps. Desirably, lamp modulating circuitry would be as inexpensive as possible, would be housed in a very small, lightweight housing, and would be usable with presently existing installed fluorescent lamps. If the foregoing problems can be dealt with adequately, it then would be feasible for consumers to employ fluorescent lamps, particularly ultraviolet lamps, in the home to create an entertaining atmosphere for listening and dancing to music projected through loudspeakers.

Other problems not adequately addressed by prior techniques relate to the functional performance of the lamp flashing circuitry itself. More specifically, prior audio lamp modulating techniques have displayed excessive lamp degradation and dropout characteristics, as well as being generally insensitive to volume, failing to respond to different types of musical "beats," and failing to properly start the lamps. In a home entertainment environment, room lighting presumably will be provided entirely by fluorescent or ultraviolet lamps, and flashing of the lamps under these circumstances must occur on a one-to-one correlation with audio beat. Moreover, the lamp flashing circuitry must be adaptable to different volume conditions occasioned by different instruments being used in different songs, different volume levels being selected by different individuals, and different placements of the lamp flashing circuitry relative to the audio source.

In view of the foregoing problems, it is an object of the invention to provide audio-modulated lamp flashing circuitry especially adapted for fluorescent lamps.

It is another object of the invention to provide audio-modulated lamp flashing circuitry employing a minimum of components to carry out a flashing function, which components are relatively inexpensive and are housed relatively compactly.

It is yet another object of the invention to provide an audio-modulated flashing fluorescent lamp in which the flashing circuitry is sufficiently inexpensive and compact that it can be used by the consumer for home use.

It is yet another object of the invention to provide an audio-modulated flashing fluorescent lamp which may be modulated without dropping out, which will not exhibit excessive degradation, which will not be too sensitive to volume, which will respond to many types of "beats," and which may be easily and reliably started.

SUMMARY OF THE INVENTION

The foregoing disadvantages of the prior art are overcome, and the objects of the invention are carried out, by lamp modulating circuitry which employs an input filter to screen signals having frequencies less than 20 hertz or greater than 200 hertz. The input filter includes several resistors and capacitors, along with an operational amplifier. Signals transmitted by the input filter are sent through an amplitude demodulator.

The amplitude demodulator according to the invention employs a resistor, a capacitor, and a diode to detect peak signal amplitude. The diode detects the peak, the capacitor stores the peak voltage, and the resistor discharges the capacitor. The signal processed by the amplitude demodulator is an envelope representing the peak amplitude of the low audio frequencies. Further signal processing is required to use this product in environments having different audio volumes.

The signal from the amplitude demodulator is sent to an automatic gain control which assures proper operation over a wide range of volume conditions. The signal from the capacitor included as part of the amplitude demodulator represents the signal from the peak detector. An average signal is developed using a low pass filter (less than one hertz response) consisting of a resistor and a capacitor. The instantaneous and the average signals are compared by an operational amplifier. The output of the operational amplifier is a quasi-square wave which is used to gate a silicon controlled rectifier (SCR). When the output of the operational amplifier is high, the SCR is gated so as to result in full power output to the lamp. When the output of the operational amplifier is low, the SCR is turned off, resulting in less power being supplied to the lamp.

The low pass filter also controls the start power supplied to the lamp. When power is initially applied, the amplitude demodulator capacitor charges rapidly, and the low pass filter capacitor lags for several seconds because of a large voltage swing and large time constant. The operational amplifier interprets this condition as a full output condition and gates the SCR in an on condition. A resistor divider network is provided to insure that the SCR is on (full output power) when the audio input is removed. Accordingly, the lamp operates at full power a greater percentage of the time in order to improve its life, and flicker due to component or voltage variations is eliminated.

Resistors also are provided to properly bias the input operational amplifier, to limit the gate current to the SCR, to insure that the SCR does not self-gate due to noise or positive offset voltage from the operational amplifier, and to form a portion of the power supply.

Alternative embodiments of the invention also are provided. One embodiment of the invention employs a capacitor placed across the biased resistor divider to reduce 60 hertz ripple. Additionally, a different approach to peak detector and offset bias circuitry is employed. Various other embodiments of the invention modify the basic circuitry described earlier to provide different operational characteristics.

DESCRIPTION OF THE PREFERRED EMBODIMENT

Figure 1:
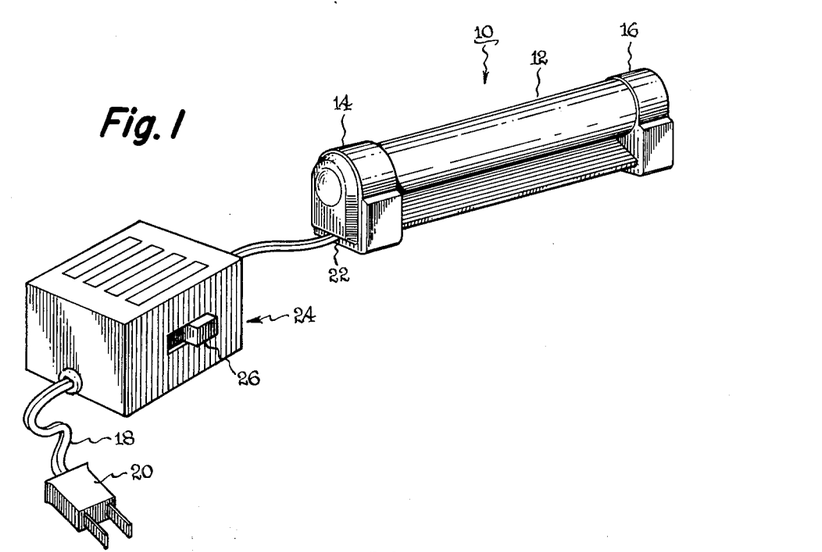
FIG. 1 is a perspective view of apparatus according to the invention in which an ultraviolet fluorescent lamp is powered by a line cord in which an audio modulator is placed.

Referring to FIG. 1, a fluorescent lamp 10 is shown. The lamp 10 includes a glass tube 12 having a pair of end support caps 14, 16 attached at either end. The lamp 10 may be an ultraviolet fluorescent lamp as is commonly used to provide interesting visual effects. The lamp 10 is powered by a line cord 18 having a plug 20 for insertion into an electrical outlet (not shown) and a plug 22 for connection to the end cap 14. A modulator 24 having an on-off switch 26 and an audio input grill 28 is disposed in the line cord 18. The modulator 24 is exceedingly compact and lightweight, having external dimensions of only about $4\frac{1}{2}'' \times 3'' \times 1\frac{1}{2}''$.

Figure 2:
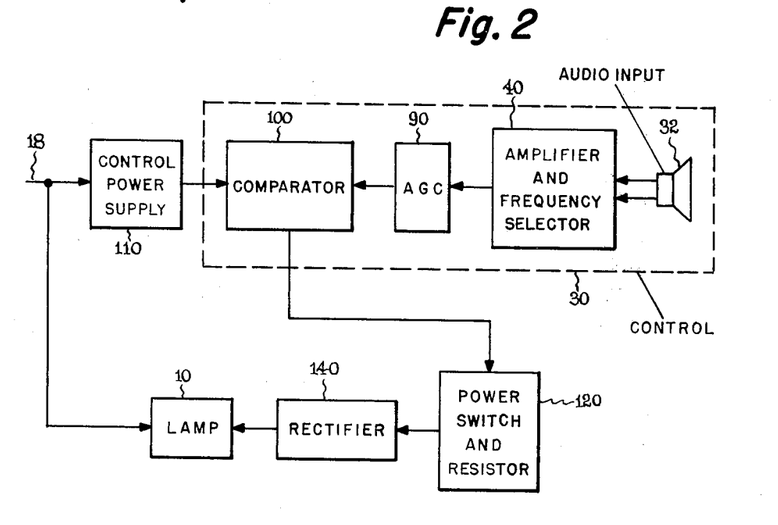
FIG. 2 is a block diagram of lamp modulating circuitry according to the invention.

Referring to FIG. 2, a block diagram schematically illustrates lamp flashing/modulating circuitry as incorporated in the modulator 24. The lamp 10 is supplied with current processed by a control 30. The control 30 includes an audio input 32 in the form of a speaker-microphone. The audio input 32 presents a signal to an amplifier and frequency selector 40. The amplifier and frequency selector 40 acts as a low pass filter to process frequencies between 20-200 hertz and amplify the selected frequencies. The control 30 also includes an automatic gain control 90 and a comparator 100. Power to the control 30 is provided by a control power supply 110. The output of the control 30 is a signal sent to a power switch and resistor 120. A signal from the power switch and resistor 120 is sent to a rectifier 140 which, in turn, provides a power signal for the lamp 10.

The Audio Input 32 and the Amplifier and Frequency Selector 40

Figure 3:
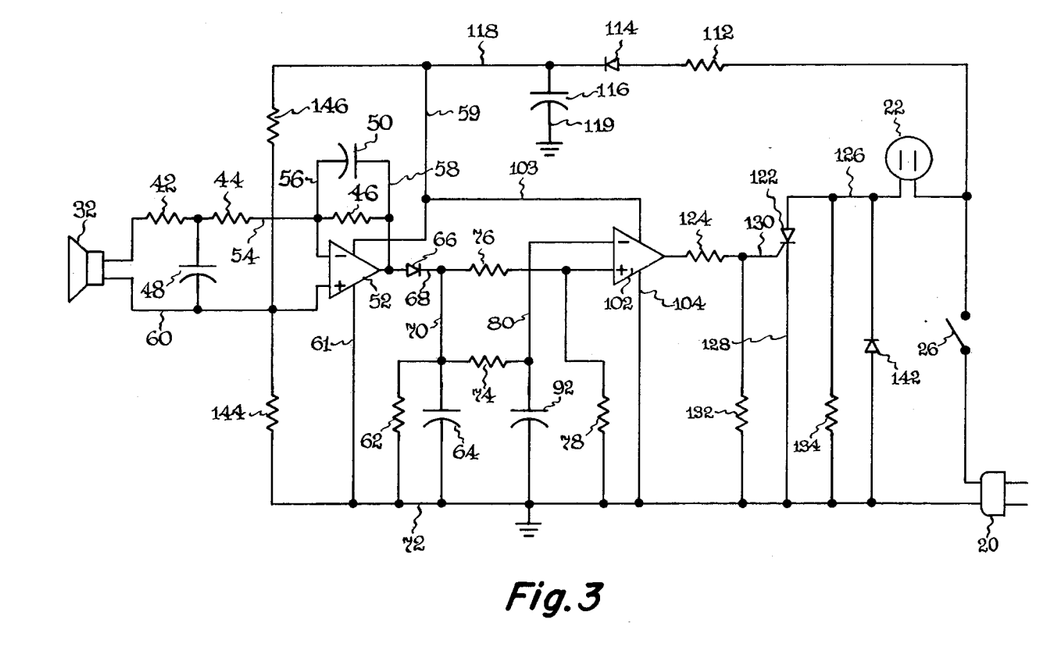
FIG. 3 is a schematic representation of lamp modulating circuitry according to one embodiment of the invention; and, FIGS. 4-7 are schematic views of alternative embodiments of lamp modulating circuitry according to the invention.

Referring to FIG. 3, a schematic diagram of lamp modulating circuitry according to the invention is shown. Where appropriate, reference numerals from FIGS. 1 and 2 are employed in the schematic diagrams of FIGS. 3-7. The audio signal for the modulator 24 is provided by a speaker-microphone 32. The microphone 32 may be a Lafayette crystal microphone, part no. 99-45189. The amplifier and frequency selector 40 includes resistors 42, 44, 46, capacitors 48, 50, and an amplifier 52. The resistors 42, 44 are in series with each other in a line 54. The resistor 46 and the capacitor 50 are in parallel with each other and are connected to lines 56, 58. The line 54 is connected to the line 56 which, in turn, is connected to the negative input side of the amplifier 52. The other end of the line 54 is connected to the speaker 32. A power supply line 59 is connected to the amplifier 52. A line 60 is connected at one end to the speaker 32 and at the other end to the positive input side of the amplifier 52. The capacitor 48 is connected between the lines 54, 60 at a location intermediate the resistors 42, 44. A control ground lead 61 also is connected to the amplifier 52.

The resistors 42, 44 have a value of 1,000 ohms, the resistor 46 has a value of one megohm, the capacitor 48 has a value of 0.1 microfarads, and the capacitor 50 has a value of 750 picofarads. Taken together, the components of the amplifier and frequency selector 40 serve as a low pass filter to screen out frequencies lower than 20 hertz and higher than 200 hertz. Signals in this frequency range carry an excellent "beat" for dancing. Signals lower than 20 hertz are seldom transmitted by speakers and are difficult to detect, even if transmitted. Frequencies higher than 200 hertz will be detected but attenuated by the amplifier and frequency selector 40. The signal from the amplifier and frequency selector 40 is then processed by an amplitude demodulator included as part of the amplifier and frequency selector 40.

In order to detect the peak amplitude of the signal from the low pass filter, a resistor 62, a capacitor 64, and a diode 66 are provided. The diode 66 is positioned in a line 68 connected to the output side of the amplifier 52. The line 58 also is connected to the line 68. The resistor 62 and the capacitor 64 are connected in parallel with each other and are connected at one end to the line 68 by a line 70 and are connected at the other end to a control ground line 72. The amplitude demodulator also includes resistors 74, 76, 78. The resistor 76 is in series with the diode 66 in the line 68. The resistor 74 is connected at one end to the line 70 and at the other end to a line 80. The resistor 78 is connected across the lines 68, 72.

The resistors 62, 74, 76 have resistance of one megohm, 100 kilohms, 47 kilohms, and 10 megohms, respectively. The capacitor 64 has a value of 1.5 microfarads, and the diode 66 is a signal diode type 1N914.

The Automatic Gain Control 90 and The Comparator 100

The automatic gain control 90 compares the instantaneous and average signals derived from the amplifier and frequency selector 40. The automatic gain control 90 insures functional operation over a wide range of volume conditions. Varying volume conditions occur, among other reasons, because different instruments are used in different songs, because different volume levels are selected by different individuals, and because the distance between the modulator 24 and an audio source will vary in different applications.

The automatic gain control 90 includes the resistor 74 and a capacitor 92. The capacitor 92 is placed in the line 80 which is connected at one end to the control ground line 72 and at the other end to the negative input side of an amplifier 102. The amplifier 102 essentially comprises the comparator 100. A line 103 connects the amplifier 102 with the power supply line 59. The line 68 connects the amplifiers 52, 102 due to its attachment with the positive input side of the amplifier 102. A control ground lead 104 connects the amplifier 102 to the control ground line 72.

The Power Supply 110, The Power Switch and Resistor 120, and The Rectifier 140

The components described thus far constitute the control 30. The control power supply 110 is provided by a resistor 112, a diode 114, and a capacitor 116. The resistor 112 and the diode 114 are placed in series with each other in a line 118. The line 118 is connected at one end to the plug 20 and at the other end to the control ground line 72. The capacitor 116 is connected at one end to the line 118 and at the other end to a control ground lead 119. The resistor 112 has a value of 10 kilohms, the diode 114 is a rectifier diode type 1N5060, and the capacitor 118 has a value of 250 microfarads.

The output of the control 30 is directed to a power switch and resistor 120 consisting of a silicon controlled rectifier (SCR) 122 and a resistor 124. The anode terminal of the SCR 122 is connected to the plug 22 by a line 126. The cathode terminal of the SCR 122 is connected to the control ground line 72 by a line 128. The gate terminal of the SCR 122 is connected to the output of the amplifier 102 by a line 130 in which the resistor 124 is placed. A resistor 132 is connected at one end to the line 130 and at the other end to the control ground line 72. A resistor 134 is connected at one end to the line 126 intermediate the plug 22 and the diode 122 and is connected at the other end to the control ground line 72. The diode 122 is a General Electric type C106M, and the resistors 124, 132, and 134 have values of 10 kilohms, 470 ohms, and 3500 ohms, respectively.

The rectifier 140 includes a diode 142 connected across the line 126 and the control ground line 72. One end of the control ground line 72 is connected to the line 60 and the line 118. The line 72 also includes a resistor 144. The other end of the control ground line 72 is connected to the plug 20. A resistor 146 is placed in the line 118. Together, the resistors 144, 146 form a resistor divider to properly bias the input to the amplifier 52. The diode 142 is a rectifier diode type 1N5060 and the resistors 144, 146 each have a value of 10 kilohms.

Operation

It will be assumed that the plug 20 has been connected to a source of 60 hertz, 110 volt alternating current, that the plug 22 has been connected to the lamp 10, and that the switch 26 has been closed.

Under these circumstances, the power supply 110 will be activated. In turn, power will be supplied to the amplifier 52. Upon receipt of a suitable audio signal, the speaker 32 will transmit a signal to the amplifier 52 via the amplifier and frequency selector 40. Only signals having frequencies between 20 and 200 hertz will be processed.

An important function of the amplifier and frequency selector 40 is that of conditioning the signal derived from the resistors 42, 44, 46, the capacitors 48, 50 and the amplifier 52. Although it would be possible to use the signal received directly from the low pass filter, such a signal would not yield optimum performance. Among other reasons, this is because the power source is 60 hertz, an SCR is utilized to control the power source and the SCR inherently cannot operate higher than 120 hertz, the rythmic beat of the music certainly will be lower than 20 hertz, changes in light above 30 hertz are indistinguishable to the eye, and, most importantly, light modulation and audio "beat" must be correlated. With commercially available color organs, an acceptable light modulation occurs so long as the music changes. With the lamp 10, however, lamp modulation must correlate to the beat of the music because room illumination is intended to be provided by the lamp 10.

The circuitry according to the invention extracts the beat of the music by detecting the peak amplitude of the signal from the low pass filter. Thereafter, the peak amplitude detector develops a signal based on signals received from the low pass filter. The components employed to detect the peak amplitude are the resistor 62, the capacitor 64, and the diode 66. The diode 66 detects the peak amplitude, the capacitor 64 stores the peak voltage, and the resistor 62 provides a controlled discharge of the capacitor 64. The signal processed thus far is an envelope representing the peak amplitude of the low audio frequencies. Further signal processing is required to use this product in environments exhibiting different volumes.

As mentioned already, the automatic gain control 90 is employed to insure functional operation over a wide range of volume conditions. The automatic gain control 90 compares the instantaneous and average signals derived from the peak detector components 62, 64, 66. The instantaneous signal is represented by that received from the capacitor 64. The average signal is developed using another low pass filter (having less than ten hertz response) consisting of the resistor 74 and the capacitor 92. The instantaneous and average signals are compared by the amplifier 102 at the input terminals supplied by lines 68, 80. The voltage across the capacitor 64 is an alternating current signal between 0 and 100 hertz which, by definition, must be 50% of the time above the average voltage across the capacitor 92, and 50% of the time below the average voltage across the capacitor 92. Thus, the output of the amplifier 102 is a quasi-square wave which is used to gate the SCR 122 via the line 130.

When the output of the amplifier 102 is high, the SCR 122 is gated. In turn, the resistor 134 is bypassed and full output power is supplied to the lamp 10. When the output of the amplifier 102 is low, the SCR 122 is ungated and less power is supplied to the lamp 10, thereby causing the lamp 10 to flash. When the SCR 122 is ungated, one polarity of the power signal is supplied to the lamp 10 at full power through the diode 142. Because the diode 142 rectifies the 60 hertz signal, during the other polarity of the power signal the power is reduced to the lamp 10 and is controlled at this reduced level by the resistor 134. In effect, the lamp 10 is modulated between full power and approximately half-power when the SCR 122 is ungated. Reference is made to the Flashing Fluorescent Lamp Patent at FIG. 7 and its accompanying description for a more complete discussion of controlling operation of the lamp 10 by use of an "upstream" control employing a diode, a resistor, and a gated SCR.

Under initial startup conditions, it is important that the lamp 10 be able to start at full power without modulation. In order to carry out this type of startup function, the resistor 74 and the capacitor 92 are employed. When power is applied initially, the capacitor 64 charges rapidly, but the capacitor 92 lags for several seconds because of the large voltage swing and long time constant. The signals transmitted to the amplifier 102 cause the amplifier 102 to interpret this condition as a full output condition and the amplifier 102 therefore gates the SCR 122 to an "on" condition.

The resistors 76, 78 form a resistor divider network which insures that the SCR 122 is "on" when audio input is removed so that the lamp 10 receives full power. This insures that lamp 10 operates at full power a greater percentage of the time so as to improve its life. Prolonged low power operation is undesirable due to increased cathode fall under low power conditions. This technique also guarantees that the lamp 10 will always be in a full power condition with no audio input whatsoever, and it also removes the flicker due to component or voltage variations whenever audio input is removed.

The function of the resistor 124 is to limit the gate current to the SCR 122 so as to prevent damage to the SCR 122. The resistor 132 insures that the SCR 122 does not self-gate due to extraneous noise or positive offset voltage from the amplifier 102.

Alternative Embodiments

The embodiments of the invention illustrated by FIGS. 4–7 are largely similar to the embodiment of the invention described already by way of reference to FIGS. 1–3. In the discussion to follow, only significant differences from FIGS. 1–3 will be discussed, and the same reference numerals, where appropriate, will be used in FIGS. 4–7 as have been used in FIGS. 1–3.

Figure 4:
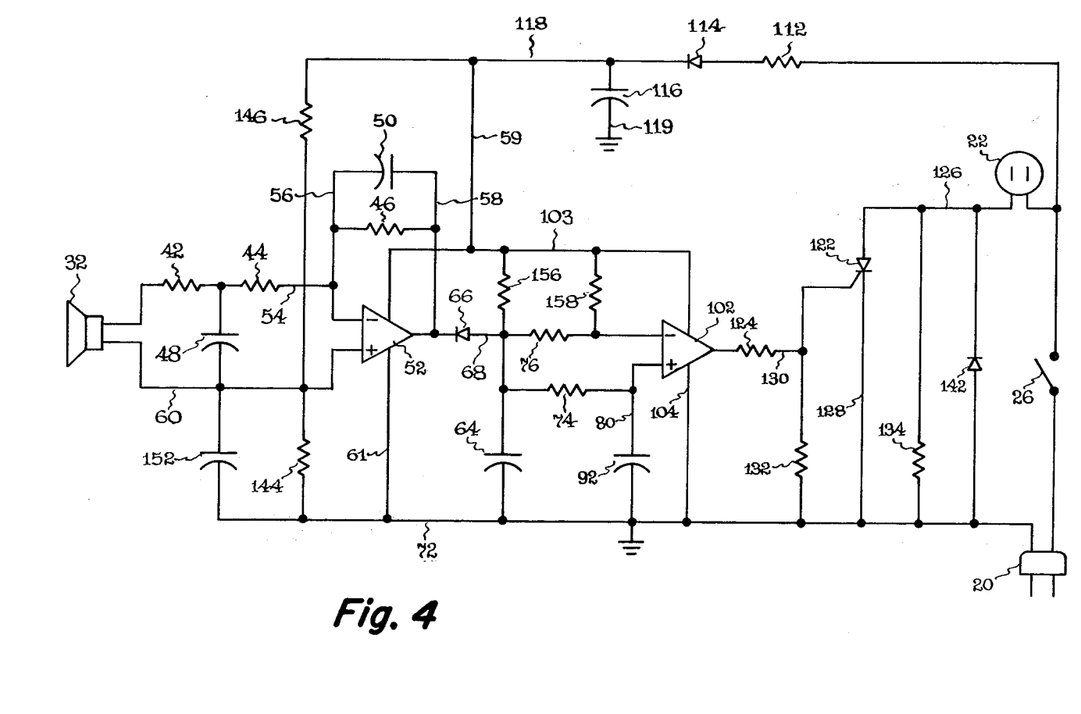

A first difference in the embodiment of the invention shown in FIG. 4 is that a 10 microfarad capacitor 152 is connected across the bias resistor divider in order to reduce 60 hertz ripple. In this embodiment of the invention, the resistor 144 which had a value of 10 kilohms now has a value of 22 kilohms. The capacitor 152 is connected at one end to the line 60 in series with the capacitor 48 and at the other end to the control ground line 72.

The embodiment of the invention in FIG. 4 also includes a different implementation of peak detector and offset bias circuitry. In this embodiment of the invention, the resistors 62, 78 are eliminated and resistors 156, 158 are added. The resistors 156, 158 are connected across the lines 68, 103 at locations intermediate the diode 66 and the resistor 76, and the resistor 76 and the amplifier 102, respectively. The resistor 56 has a value of 100 kilohms and the resistor 158 has a value of 10 megohms. Other differences include: capacitor 48 has a value of 1.5 microfarads, resistor 76 has a value of 10 kilohms, resistor 112 has a value of 12 kilohms, capacitor 116 has a value of 25 microfarads, and SCR 122 is a General Electric type C103M.

Figure 5:
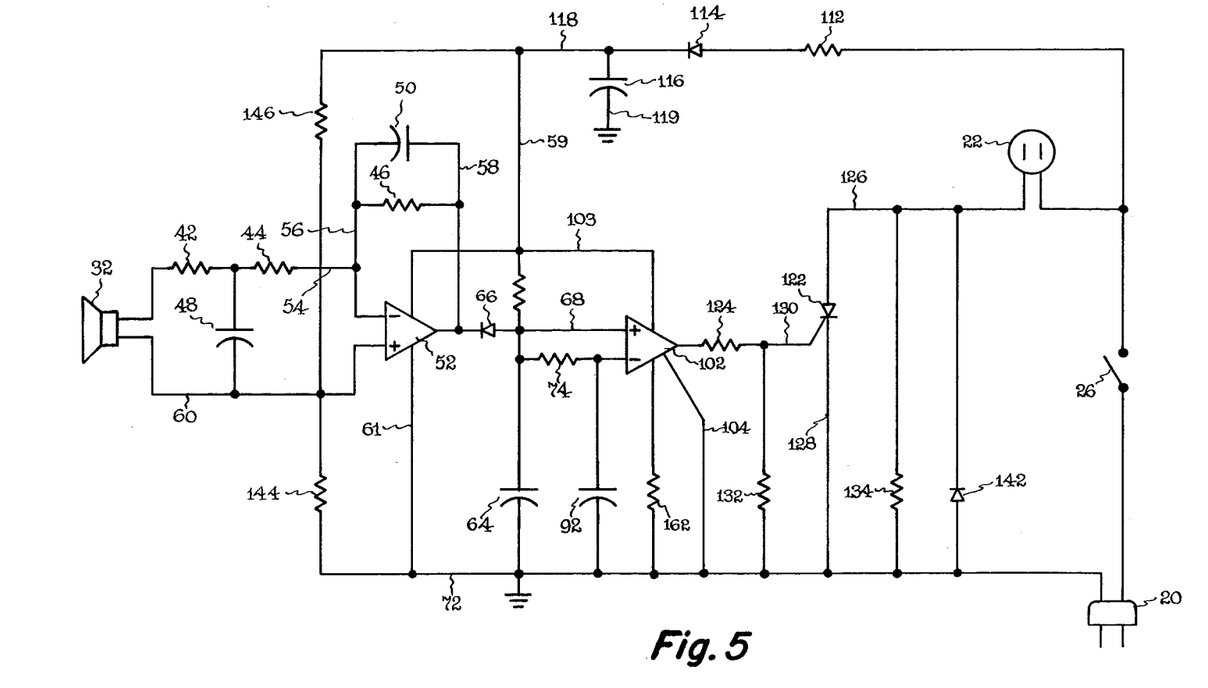

In the embodiment of the invention illustrated in FIG. 5, the resistors 62 and 78 have been eliminated, the values of the capacitors 64, 92 have been changed to one microfarad and three microfarads, respectively, and the resistor 76 has been eliminated. Furthermore, the resistor 156 of FIG. 4 has been connected between the lines 68, 103, but the resistor 158 has not been used. The values of the resistors 144, 146 have been changed to 100 kilohms, the capacitor 48 is 1.0 microfarad, the resistor 124 has a value of 3300 ohms, and the SCR 122 is a General Electric type C103M. A resistor 162 having a resistance of 1000 ohms has been connected intermediate the amplifier 102 and the ground line 72. The embodiment of the invention illustrated in FIG. 5 represents another approach to bias the amplifier 102 so that the lamp 10 is under full power whenever an audio input signal from the speaker 32 is removed.

Figure 6:
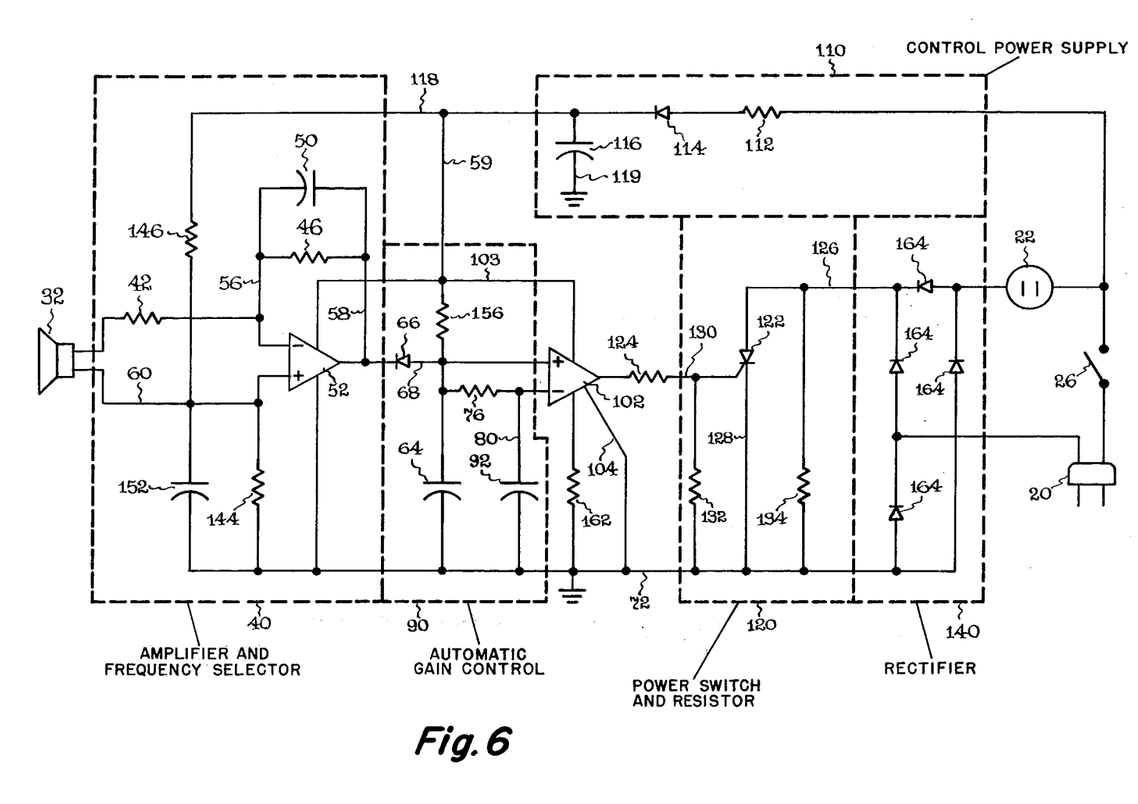
Figure 7:
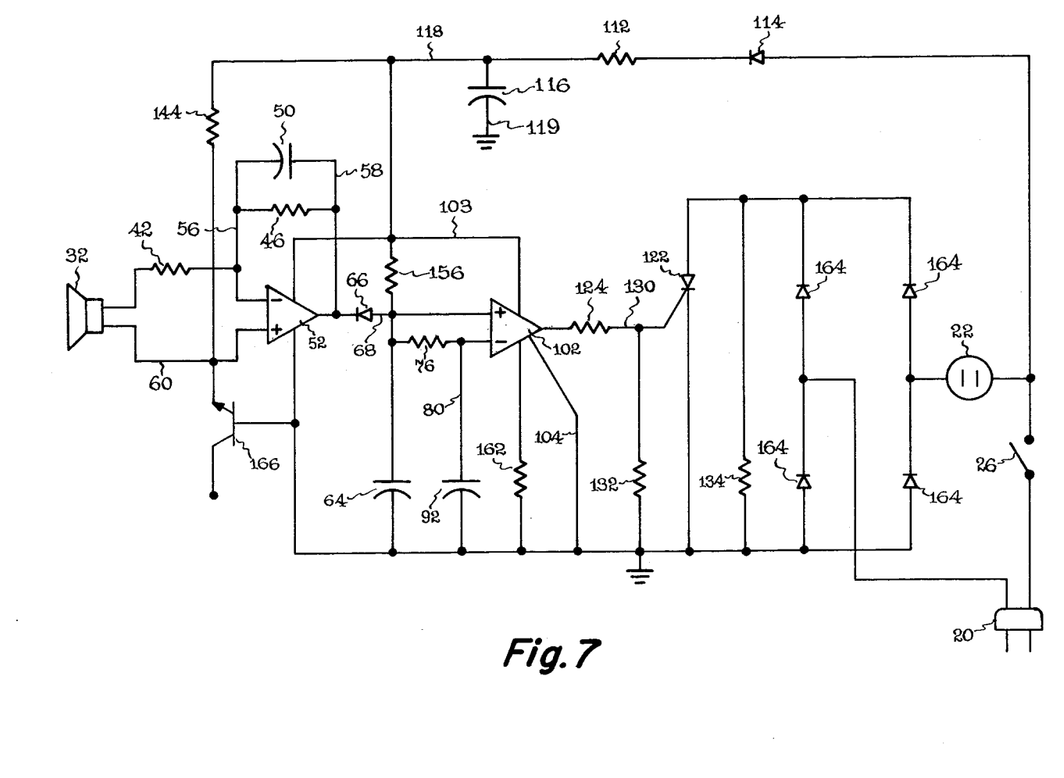

The embodiment of the invention illustrated in FIG. 6 is a combination of the circuits illustrated in FIGS. 3 and 4 and has portions of the block diagram of FIG. 2 superimposed. Also, the rectifier 140 has been changed. The embodiment of the invention illustrated in FIG. 7 is largely identical to that illustrated in FIG. 6, except that an improved technique to reduce power supply ripple is employed.

Referring to FIG. 6, the resistor 44 and the capacitor 48 have been eliminated from the amplifier and frequency selector 40. The automatic gain control 90 includes the resistor 156 connected across the lines 68, 103, but the resistor 158 has been eliminated. Further, the resistors 62, 78 have been eliminated, although the resistor 162 has been included. The rectifier 140 includes four substantially identical diodes 164 connected to form a full wave bridge placed in parallel with the SCR 122 and the resistor 134. The diodes 164 have the same performance values as the diodes 142 of the earlier-described embodiments.

The other component values are the same as that described earlier with respect to FIG. 3, with the following exceptions: resistor 42—1800 ohms; resistors 144, 146—each 100 kilohms; capacitor 152—3.3 microfarads; resistor 156—100 kilohms; capacitors 64, 92—each 3.3 microfarads; resistor 162—1000 ohms; resistor 124—3300 ohms; SCR 122—type 2N5064.

In operation, like the earlier-described embodiments, when the output of the amplifier 102 is high, the SCR 122 is gated. In turn, the resistor 134 is bypassed and full output power is supplied to the lamp 10. When the output of the amplifier 102 is low, the SCR 122 is ungated and less power is supplied to the lamp 10, thereby causing the lamp 10 to flash. When the SCR 122 is ungated, both polarities of the power signal are passed through the resistor 134 and power supplied to the lamp 10 is controlled at a reduced level by the resistor 134. Use of the full wave bridge results in an especially effective flashing action compared with use of the diode 142. Reference is made to the Flashing Fluorescent Lamp Patent at FIG. 8 and its accompanying description for a more complete discussion of controlling operation of the lamp 10 by use of an "upstream" control employing a full wave diode bridge, a resistor, and a gated SCR.

The circuit of FIG. 7 is largely similar to that of FIG. 6, except that a zener diode 166 has replaced the capacitor 152 and the resistor 144 has been eliminated. The use of the zener diode 166 is an improved technique to reduce power supply ripple. The zener diode 166 is a transistor type 2N3414 operated as a zener diode. Other component value distinctions in the embodiment of FIG. 7 as compared to the embodiment of FIG. 6 are: resistor 144—6800 ohms; resistor 76—33 kilohms; resistor 124—6800 ohms; resistor 132—1000 ohms. The embodiments of the invention illustrated in FIGS. 6 and 7 are intended to function as production versions of the invention, with the embodiment of FIG. 7 being preferred for its relative inexpensiveness, simplicity, and performance.

Although the invention has been disclosed with a certain degree of particularity, it will be understood that the present disclosure of the preferred embodiment has been made only by way of example and that various changes may be resorted to without departing from the true spirit and scope of the invention. It is intended that the patent shall cover, by suitable expression in the appended claims, whatever features of patentable novelty exist in the invention disclosed.

What is claimed is:

1. Audio-modulated switching circuitry for controlling the intensity of light emitted by a light source, comprising:
    (a) an audio input;
    (b) a filter for filtering signals received from the audio input within a predetermined low audio frequency range;
    (c) an amplitude demodulator for receiving signals received from the filter and for transmitting signals proportional to the peak amplitude of the signals received from the filter;
    (d) an automatic gain control for detecting instantaneous and average signals received from the amplitude demodulator and thereafter generating signals representative of the detected instantaneous and average signals;

(e) a comparator for comparing the signals received from the automatic gain control and thereafter generating either a high voltage output or a low voltage output; and (f) a switching means connected intermediate the light source and the comparator, the switching means causing the light output of the light source to vary in response to changes in signals received from the comparator.

2. The audio-modulated switching circuitry of claim 1, where the predetermined frequency range is 20–200 hertz.

3. The audio-modulated switching circuitry of claim 1, wherein the amplitude demodulator includes a diode for detecting the peak amplitude of signals received from the filter, a capacitor for storing peak voltage, and a resistor to provide a controlled discharge of the capacitor.

4. The audio-modulator switching circuitry of claim 1, wherein the automatic gain control includes a filter to develop an average signal received from the amplitude demodulator, the filter having less than 10 hertz response.

5. The audio-modulated switching circuitry of claim 1, wherein the comparator is in the form of an operational amplifier.

6. The audio-modulated switching circuitry of claim 1, wherein the switching means includes a silicon controlled rectifier having a gate terminal, the silicon controlled rectifier being switchable between a first mode where full output power is supplied to the light source, and a second mode where less power is supplied to the light source, the gate terminal being responsive to signals received from the comparator.

7. The audio-modulated switching circuitry of claim 6, further including a resistor and a diode connected in parallel with the silicon controlled rectifier.

8. The audio-modulated switching circuitry of claim 6, further including a full wave diode bridge and a resistor connected in parallel with the silicon controlled rectifier.

9. Audio-modulated switching circuitry for controlling the intensity of light emitted by a light source in which an audio input and switching means are connected to the light source, the switching means causing the light output of the light source to vary in response to changes in signals received from the audio input, the improvement comprising:

(a) a filter for filtering signals received from the audio input within a predetermined low audio frequency range;

(b) an amplitude demodulator connected to the filter output, the amplitude demodulator adapted to receive signals from the filter output and to transmit signals proportional to the peak amplitude of the signals received from the filter output; and (c) an automatic gain control connected intermediate the amplitude demodulator and the switching means, the automatic gain control detecting instantaneous and average signals received from the amplitude demodulator and thereafter generating signals representative of the detected instantaneous and average signals, the amplitude demodulator causing the switching means to apply full operating power to the light source when no sound input from the audio input is received, the amplitude demodulator causing the switching means to apply less than full power to the light source when differences in peak audio inputs exceed a predetermined level.

10. The audio-modulated switching circuitry of claim 9, wherein the predetermined frequency range is 20–200 hertz.

11. The audio-modulated switching circuitry of claim 9, wherein the amplitude demodulator includes a diode for detecting the peak amplitude of signals received from the audio input, a capacitor for storing peak voltage, and a resistor to provide a controlled discharge of the capacitor.

12. The audio-modulated switching circuitry of claim 9, wherein the automatic gain control additionally includes a comparator for comparing the instantaneous and average signals generated by the automatic gain control and thereafter generating either a high voltage output signal or a low voltage output signal.

13. The audio-modulated switching circuitry of claim 12, wherein the comparator is in the form of an operational amplifier.

14. The audio-modulated switching circuitry of claim 13, wherein a resistor divider is provided for one input to the operational amplifier, the resistor divider insuring that the switching means is switched to a full power output condition whenever an audio input is removed.

15. The audio-modulated switching circuitry of claim 12, further including circuitry to require the switching means to be in a full power output condition during initial startup of the lamp.

16. The audio-modulated switching circuitry of claim 15, wherein the circuitry to insure full power startup includes a capacitor connected to each input of the comparator and a resistor connected across the input lead lines to the comparator, the capacitors charging at different rates upon initial startup conditions to provide the comparator with an input signal requiring a comparator output signal sufficient to cause the switching means to switch the light source to a full power condition.

17. The audio-modulated circuitry of claim 9, wherein the switching means includes a silicon controlled rectifier having a gate terminal, the silicon controlled rectifier being switchable between a first mode where full output power is supplied to the light source, and a second mode where less power is supplied to the light source, the gate terminal being responsive to signals received from the automatic gain control.

18. The audio-modulated switching circuitry of claim 17, further including a resistor and a diode connected in parallel with the silicon controlled rectifier.

19. The audio-modulated switching circuitry of claim 17, further including a full wave diode bridge and a resistor connected in parallel with the silicon controlled rectifier.

20. Audio-modulated switching circuitry for controlling the intensity of light emitted by a light source, comprising:

(a) an audio input;

(b) a filter for filtering signals received from the audio input within a predetermined frequency range on the order of 20–200 hertz;

(c) an amplitude demodulator for receiving signals from the filter and for transmitting signals proportional to the peak amplitude of the signals received from the filter, the amplitude demodulator including a diode for detecting the peak amplitude of signals received from the audio input, a capacitor for storing peak voltage, and a resistor to provide a controlled discharge of the capacitor;

(d) an automatic gain control for detecting instantaneous and average signals received from the amplitude demodulator and thereafter generating signals representative of the detected instantaneous and average signals, the automatic gain control additionally including a low pass filter having a response of less than 1 hertz;

(e) a comparator for comparing the signals received from the automatic gain control and thereafter generating either a high voltage output or a low voltage output;

(f) a resistor divider for one input to the comparator, the resistor divider insuring that the comparator is in the high voltage output condition whenever an audio input is removed;

(g) circuitry connected to the comparator to require the comparator to be in a high output condition during initial start up of the light source, the circuitry including a capacitor connected to each input of the comparator and a resistor connected across the input lead lines to the comparator, the capacitors charging at different rates upon initial start up conditions to provide the comparator with an input signal requiring a high voltage output comparator signal; and, (h) a switching means connected intermediate the lamp and the comparator, the switching means causing the light output of the light source to vary in response to changes in signals received from the comparator, the switching means including a silicon controlled rectifier having a gate terminal, the silicon controlled rectifier being switchable between a first mode where full output power is supplied to the light source upon the gate terminal receiving a high output signal from the comparator, and a second mode where less power is supplied to the light source upon the gate terminal receiving a low output signal from the comparator.

21. The audio-modulated switching circuitry of claim 20, further including a full wave diode bridge and a resistor connected in parallel with the silicon controlled rectifier.

* * * * *